(No Model.)
G. N. RILEY.
JOINT FOR GAS MAINS.
No. 372,568. Patented Nov. 1, 1887.
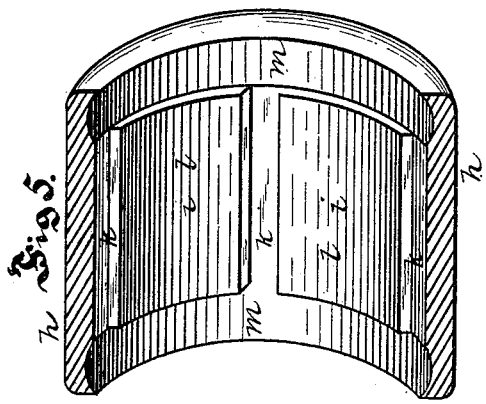
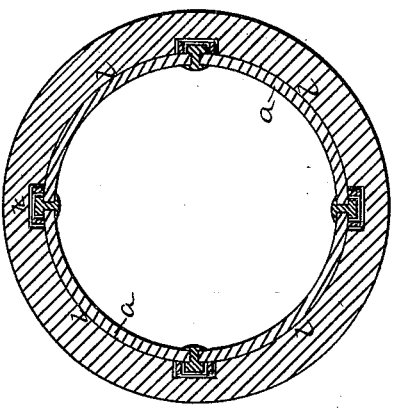
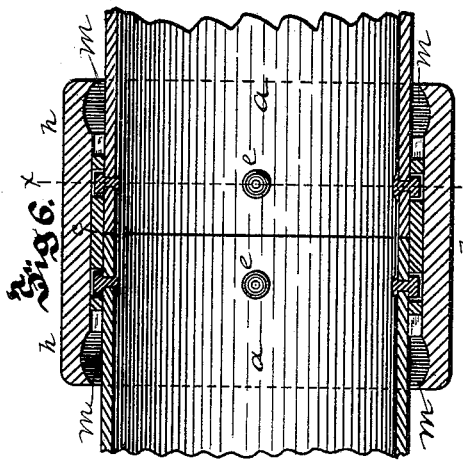
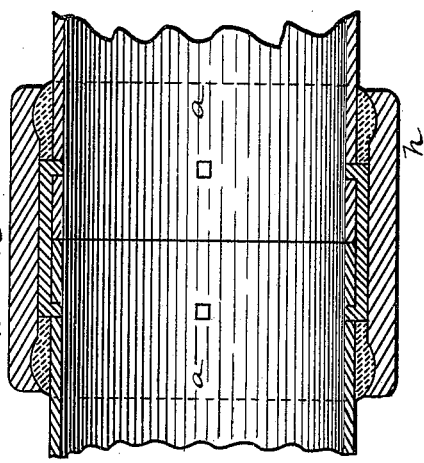
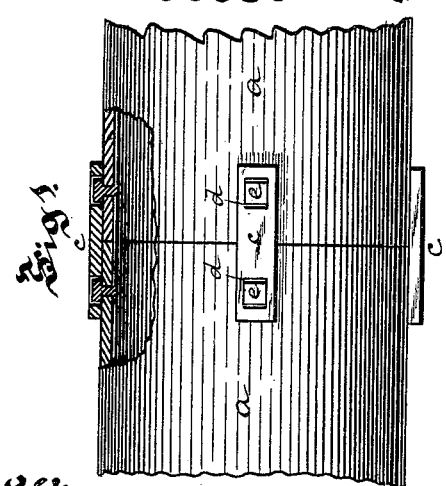
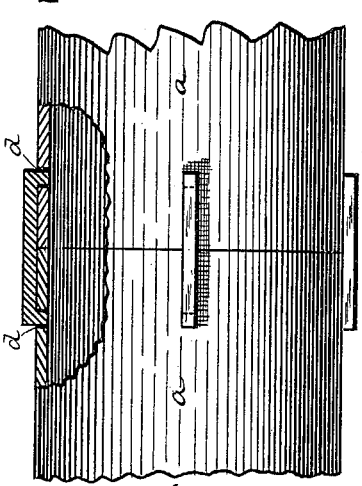
Witnesses:
J. T. Cooke
T. E. Barnes
Inventor.
George N. Riley
By James H. Kay
Attorney

UNITED STATES PATENT OFFICE.

GEORGE N. RILEY, OF BRADDOCK, ASSIGNOR TO EDMUND C. CONVERSE, OF ALLEGHENY CITY, PENNSYLVANIA.

JOINT FOR GAS-MAINS.

SPECIFICATION forming part of Letters Patent No. 372,568, dated November 1, 1887.

Application filed October 20, 1886. Serial No. 216,701. (No model.)

*To all whom it may concern:*

Be it known that I, GEORGE N. RILEY, of Braddock, in the county of Allegheny and State of Pennsylvania, have invented a new and useful Improvement in Joints for Gas-Mains; and I do hereby declare the following to be a full, clear, and exact description thereof.

My invention relates to joints for connecting tubing, its special object being to provide an efficient joint for connecting light wrought-metal tubing without the employment of threads on the tubing or coupling, so that the tubing is not cut into and weakened, as is the case where the ends thereof are threaded.

It has been proposed to unite the ends of tube sections together by hooks or straps having lugs on the end fitting into holes in the end of each tube section, and over the joint thus formed is placed a plain sleeve which bears on the outer surface of the straps, the space between the sleeve, straps, and tube-sections being calked with lead; but this has the disadvantages that no seat is formed for the calking materials, which is therefore liable to work out, and is difficult to put in place, and requires a large amount of lead, as well as great danger that an imperfect joint will be formed. I have found that by providing grooves in the sleeve for the straps or hooks to rest in, and having calking-recesses at each end of the sleeve, a much tighter, better, and more economical joint is obtained, as a firm seat for the straps, as well as for the calking material, is obtained, and not so much lead is required to calk the joint.

To enable others skilled in the art to make and use my invention, I will describe the same more fully, referring to the accompanying drawings, in which—

Figures 1 and 2 are side views, partly in section, showing the ends of the pipes connected by straps, two different forms of straps being shown as employed with the tubing. Figs. 3 and 4 are perspective views of the straps employed. Fig. 5 is a sectional perspective of the inclosing-collar. Figs. 6 and 7 are longitudinal central views showing the two different forms of connecting-straps, and Fig. 8 is a cross-section on the line $x\,x$, Fig. 6.

Like letters of reference indicate like parts in each.

The tube-sections $a\,a$ shown are formed of wrought metal, the tubing employed being what is known as "light wrought-metal tubing," this tubing being much lighter than the ordinary threaded tubing, as it is not cut into and weakened by the threads formed therein, and the tubing is therefore as strong at the joints to sustain an internal pressure-strain or any lateral strain as in the body of the tubing. The tube-sections are connected by the straps $c$, two forms of these straps being shown, that in Fig. 1 being provided with seats or holes $d$, which fit over the lugs $e$ on the tubing, these lugs $e$ being generally formed of rivets, as shown, while the straps employed in Fig. 2 are metal bars, having lugs $e$ extending down therefrom, which enter seats or holes $d$ in the tube-sections, these lugs on the straps entering the seats in the pipes acting in the same manner to connect the tube sections as the lugs on the tube-sections entering the seats in the straps, as shown in Figs. 1 and 3. The inclosing-collar $h$ may be forged or cast to shape, and it is provided with the central portion, $i$, corresponding in diameter to the exterior diameter of the tubing which fits around the ends of the tubing at the joint and acts to support the tube-sections against lateral strain. In this central portion are formed grooves $k$, corresponding in position to the position of the connecting-straps on the tube-sections and adapted to fit around the said straps after they are secured upon the tube-sections, the central portion being thus divided into two or more faces, $l$, which bear upon the tube-sections between these grooves, and the walls of the grooves fitting closely around the straps and so holding them in position and preventing them from being disconnected from the tube-sections. The collars $h$ extend a short distance beyond the ends of the straps, and so form calking-recesses $m$, for the reception of lead or other suitable packing by means of which the joint is sealed, the packing material acting also to support the tube-sections at the ends of the collars and to lock the straps in their position within the collars and in engagement with the tube sections. As the inclosing-collar fits closely around the tube sections at the joint, it also prevents the lead or other packing material from flowing between the ends of the tube-sections and into the interior thereof.

In forming a joint by means of my invention the inclosing-collar is slipped onto one of the pipes, and when the pipes are in position the straps c are secured in place, the seats d in the straps fitting over the lugs e on the tube-sections, or the lugs e on the straps fitting into the seats d in the tube-sections, and the collar h is then slipped over these straps, the straps entering the grooves k, and the interior bearing-faces, l, of the central portion, i, fitting closely around the ends of the tube-sections. The lead or other packing material is then poured or packed into the calking-recesses m of the collar, and the joint is formed. The packing material is prevented from entering between the ends of the tube-sections and flowing into the interior of the pipe by the interior faces, l, fitting around the ends of the tubing, and the collar is secured against longitudinal movement by this calking or packing material, so that a permanent and tight joint is obtained. In order to provide for the expansion and contraction of the tube section connected, and also, if necessary, to provide for a slight deflection of the tubing, the seats d in the straps or in the tube-sections are made slightly longer than the lugs entering the same, so that sufficient room for the deflection of the tube-sections joined is obtained and room is provided for such slight longitudinal movement in the straps connecting them directly together, while they are braced against transverse strain by the collar fitting over the straps, and a tight joint is obtained by the calking or packing material within the annular recesses at the ends of the collars.

As it is not necessary to form any particular locking-recess within the collar itself, the collars can be cast more cheaply than the ordinary collar in which locking-lugs enter seats within the collar, and for this reason, if desired, the collars may be formed of wrought metal and forged to shape, this being desirable when employed with high-pressure gas-mains, where the gas might be liable to leak through the pores of the cast metal, but would be confined by the close texture of the wrought-metal collar.

What I claim as my invention, and desire to secure by Letters Patent, is—

In combination with two tube-sections, straps engaging said tube sections and a sleeve or collar having a central portion fitting around and bearing on the ends of the tube-sections and provided with grooves therein to receive the straps, said collar extending beyond the straps and having calking-recesses in its ends, substantially as set forth.

In testimony whereof I, the said GEORGE N. RILEY, have hereunto set my hand.

GEORGE N. RILEY.

Witnesses:
J. N. COOKE,
I. E. BARNES.